United States Patent

(12) United States Patent
Laycock et al.

(10) Patent No.: US 8,375,170 B2
(45) Date of Patent: Feb. 12, 2013

(54) APPARATUS AND METHOD FOR HANDLING DATA IN A CACHE

(75) Inventors: Christopher William Laycock, Sheffield (GB); Antony John Harris, Hope Valley (GB); Bruce James Mathewson, Papworth Everard (GB); Andrew Christopher Rose, Cambridge (GB); Richard Roy Grisenthwaite, Guilden Morden (GB)

(73) Assignee: ARM Limited, Cambridge (GB)

( * ) Notice: Subject to any disclaimer, the term of this patent is extended or adjusted under 35 U.S.C. 154(b) by 443 days.

(21) Appl. No.: 12/656,709

(22) Filed: Feb. 12, 2010

(65) Prior Publication Data

US 2011/0202726 A1   Aug. 18, 2011

(51) Int. Cl.
G06F 12/00 (2006.01)
G06F 13/00 (2006.01)
G06F 13/28 (2006.01)

(52) U.S. Cl. ......... 711/141; 711/119; 711/130; 711/133

(58) Field of Classification Search .......... 711/118–119, 711/130, 133, 141
See application file for complete search history.

(56) References Cited

U.S. PATENT DOCUMENTS 7,089,408 B2 * 8/2006 Check et al. ............... 712/225
2005/0015637 A1 * 1/2005 Van Eijndhoven et al. ... 713/400
2008/0052469 A1 * 2/2008 Fontenot et al. ........... 711/133
2008/0147991 A1 * 6/2008 Clark et al. ............... 711/146
2010/0269018 A1 * 10/2010 Clark et al. ............... 714/763

OTHER PUBLICATIONS

Dahgren et al., "Cache-Only Memory Architectures", *Computer, IEEE*, Jun. 1999, pp. 72-79.

* cited by examiner

*Primary Examiner* — Jared Rutz
*Assistant Examiner* — Ryan Bertram
(74) *Attorney, Agent, or Firm* — Nixon & Vanderhye P.C.

(57) ABSTRACT

A data processing apparatus for forming a portion of a coherent cache system comprises at least one master device for performing data processing operations, and a cache coupled to the at least one master device and arranged to store data values for access by that at least one master device when performing the data processing operations. Cache coherency circuitry is responsive to a coherency request from another portion of the coherent cache system to cause a coherency action to be taken in respect of at least one data value stored in the cache. Responsive to an indication that the coherency action has resulted in invalidation of that at least one data value in the cache, refetch control circuitry is used to initiate a refetch of that at least one data value into the cache. Such a mechanism causes the refetch of data into the cache to be triggered by the coherency action performed in response to a coherency request from another portion of the coherent cache system, rather than relying on any actions taken by the at least one master device, thereby providing a very flexible and efficient mechanism for reducing cache latency in a coherent cache system.

21 Claims, 12 Drawing Sheets

APPARATUS AND METHOD FOR HANDLING DATA IN A CACHE

TECHNICAL FIELD

The technology described in this application relates to an apparatus and method for handling data in a cache, and in particular, to an apparatus and method for managing data in a cache forming part of a coherent cache system.

BACKGROUND

It is known to provide multi-processing systems in which two or more master devices, for example processor cores, share access to shared memory. Such systems are typically used to gain higher performance by arranging the different processor cores to execute respective data processing operations in parallel. Known data processing systems which provide such multi-processing capabilities include IBM370 systems and SPARC multi-processing systems. These particular multi-processing systems are high performance systems where power efficiency and power consumption is of little concern and the main objective is maximum processing speed.

It should be noted that the various master devices need not be processor cores. For example, a multi-processing system may include one or more processor cores, along with other master devices such as a Direct Memory Access (DMA) controller, a graphics processing unit (GPU), etc.

To further improve speed of access to data within such multi-processing systems, it is known to provide one or more of the master devices with their own local cache in which to store a subset of the data held in the shared memory. Whilst this can improve speed of access to data, it complicates the issue of data coherency. In particular, it will be appreciated that if a particular master device performs a write operation with regards to a data value held in its local cache, that data value will be updated locally within the cache, but may not necessarily also be updated at the same time in the shared memory. In particular, if the data value in question relates to a write back region of memory, then the updated data value in the cache will only be stored back to the shared memory when that data value is subsequently evicted from the cache.

Since the data may be shared with other master devices, it is important to ensure that those master devices will access the up-to-date data when seeking to access the associated address in shared memory. To ensure that this happens, it is known to employ a cache coherency protocol within the multi-processing system to ensure that if a particular master device updates a data value held in its local cache, that up-to-date data will be made available to any other master device subsequently requesting access to that data.

The use of such cache coherency protocols can also give rise to power consumption benefits by avoiding the need for accesses to memory in situations where data required by a master device can be found within one of the caches, and hence accessed without needing to access memory.

In accordance with a typical cache coherency protocol, certain accesses performed by a master device will require a coherency operation to be performed. The coherency operation will cause a coherency request to be sent to the other master devices identifying the type of access taking place and the address being accessed. This will cause those other master devices to perform certain coherency actions defined by the cache coherency protocol, and may also in certain instances result in certain information being fed back from one or more of those master devices to the master device initiating the access requiring the coherency operation. By such a technique, the coherency of the data held in the various local caches is maintained, ensuring that each master device accesses up-to-date data. One such cache coherency protocol is the "Modified, Owned, Exclusive, Shared, Invalid" (MOESI) cache coherency protocol.

Cache coherency protocols will typically implement either a write update mechanism or a write invalidate mechanism when a master device seeks to perform a write operation in respect of a data value. In accordance with the write update mechanism, any cache that currently stores the data value is arranged to update its local copy to reflect the update performed by the master device. In accordance with a write invalidate mechanism, the cache coherency hardware causes all other cached copies of the data value to be invalidated, with the result that the writing master device's cache is then the only valid copy in the system. At that point, the master device can continue to write to the locally cached version without causing coherency problems.

It is typically much simpler to implement a write invalidate mechanism than it is to implement a write update mechanism, and accordingly the write invalidate mechanism is the most commonly used cache coherency technique.

However, when using the write invalidate mechanism, this can result in data being removed from a master device's local cache before it has necessarily finished using that data. For example, if we refer to the master device producing the updated data value as the producer, and assume that there is at least one other master device that is (or will be) performing data processing operations using that data value (such a master device being referred to as a consumer hereafter), then it will be apparent that the result of the coherency operation performed on initiation of the write operation by the producer is that the consumer's local cached copy of the data value is invalidated, and the write then proceeds in respect of the producer's local cache. When the consumer then subsequently issues a request for the data value, a miss will occur in its local cache, thereby introducing a latency whilst that data is retrieved from another cache, or from a shared memory (for example if the producer has subsequently evicted the updated data from its cache back to memory before the consumer requests the data). Hence, the use of the write invalidate mechanism has the potential to impact performance of the data processing system.

One known technique for seeking to increase the hit rate in a cache involves the use of prefetch mechanisms within a master device to seek to prefetch, into that master device's local cache, data before it is actually needed during performance of the data processing operations by that master device. Such prefetch mechanisms are described, for example, in the article "Cache-Only Memory Architectures" (COMA), by F Dahlgren et al, Computer, Volume 32, Issue 6, June 1999, Pages 72-79. COMA seeks to reduce the impact of frequent long-latency memory accesses by turning memory modules into large dynamic RAM (DRAM) caches called attraction memory (AM). When a processor requests a block from a remote memory, the block is inserted in both the processor's cache and the node's AM. Because a large AM is more capable of containing the node's current working data set than a cache is, more of the cache misses are satisfied locally within the node. The article also discusses prefetching as means for retrieving data into a cache before the processor needs it. In software-controlled prefetching, the compiler or programmer inserts additional instructions in the code to perform the prefetching. Alternatively, hardware-controlled prefetching uses a mechanism that detects memory reference patterns and uses the patterns to automatically prefetch data.

Whilst such prefetching techniques could be used in the above-described producer-consumer scenario to improve the chance of the consumer's access requests hitting in its local cache, such prefetch mechanisms can significantly complicate the operation of the master device and impact the performance of that master device due to the processing overhead involved in implementing such prefetch mechanisms.

The above type of multi-processing system, where multiple master devices share data, use caches to improve performance, and use a cache coherency protocol to ensure that all of the master devices have a consistent view of the data, is often referred to as a coherent cache system. In non-coherent cache systems, where data is not shared between the various master devices, it is known to use lockdown mechanisms in individual caches in order to lockdown one or more cache lines of data to avoid that data being evicted whilst it is still needed by the associated master device. However, in coherent cache systems, such an approach is not practical. For example, when employing a write update mechanism, it would be complex to incorporate support for locked down cache lines. Furthermore, when employing the commonly used write invalidate mechanism, it would not be possible to allow cache lines to be locked down, due to the need to be able to invalidate a cache line in any cache as part of the cache coherency mechanism.

Considering the particular producer-consumer issue discussed earlier, an alternative mechanism which could reduce the latency of access to data by a consumer would be to bypass the cache system altogether, and instead to pass the data between producers and consumers using dedicated hardware, such as FIFOs. However, these would have to be sized and positioned appropriately at SoC (System-on-Chip) design time, and hence such an approach does not provide a very flexible mechanism. Further, such an approach would add to the cost and complexity of the design, and accordingly it will generally be considered more preferable to continue to use the coherent cache system as a means for sharing data between the producers and consumers.

Another known mechanism for seeking to reduce latency of access to data by a master device is "read snarfing". In particular, when master devices have a shared data bus, then the response to a read request issued by a particular master device (say M1) is visible to another master device (say M2) in the system, since the same read data pins are provided to both M1 and M2. By such an approach M2 could populate its own cache based on the read operations performed by M1 without needing to issue a read request itself, since it can "snarf" the values that were read by M1. However, such an approach lacks flexibility, since it requires a master device utilising the snarfing approach to have visibility of the read data bus that is provided to other master devices, and requires another of those master devices to perform a read before such snarfing can take place.

Accordingly, it would be desirable to provide an improved technique for managing data within a cache forming a portion of a coherent cache system.

SUMMARY

A data processing apparatus for forming a portion of a coherent cache system, comprises: at least one master device for performing data processing operations; a cache coupled to the at least one master device and arranged to store data values for access by the at least one master device when performing said data processing operations; cache coherency circuitry, responsive to a coherency request from another portion of the coherent cache system, to cause a coherency action to be taken in respect of at least one data value stored in the cache; and refetch control circuitry, responsive to an indication from the cache coherency circuitry that the coherency action has resulted in invalidation of said at least one data value in the cache, to initiate a refetch of said at least one data value into said cache.

Refetch control circuitry is provided in association with the cache. When a coherency action results in invalidation of a data value in that cache, the refetch control circuitry initiates a refetch of that data value into the cache. In one example embodiment, such refetching can be arranged to occur in all instances where the coherency action results in invalidation of the data value in the cache, or in an alternative example embodiment the refetch control circuitry may be configured to limit said refetching to situations where the refetch control circuitry considers the at least one master device to be a consumer of said at least one data value.

When compared with the earlier-described prefetch mechanisms, the technology described in this application does not require any increase in complexity of the master device, nor does it typically have any performance impact on the operation of the master device. Instead, rather than relying on the actions of the master device itself to initiate the fetch of the data into the cache, the refetch control circuitry is triggered by the processing of a coherency request from another portion of the coherent cache system. In particular, if the coherency action performed by the cache coherency circuitry in response to that coherency request causes an invalidation of a data value in the cache, then the refetch control circuitry will automatically initiate a refetch of that data value (either in all instances, or in instances where the master device is considered to be a consumer of that data value, dependent on embodiment).

Hence, rather than the known techniques which rely on the actions of the data consumer to determine when to fetch data into the cache, the technology described in this application is triggered by a coherency action invalidating a data value in the cache (for example as will occur when a data producer in another part of the coherent cache system is generating an updated data value) to trigger the refetch of the data. Such an approach will typically result in the data value being available again in the cache significantly sooner, thereby increasing the hit rate in the cache.

Another benefit of the technology described in this application is that it is easy to implement in a heterogeneous system, i.e. a system where the various master devices are different. In particular, the refetch control mechanism is entirely independent of the type of master device connected to the cache, and does not rely on any actions taken by that coupled master device in order to initiate the refetch.

One example embodiment allows the simplicity of a write invalidate mechanism to be retained, whilst reducing the latency impact that would otherwise arise from invalidation of data from individual caches, employing a refetch mechanism that is independent of the master device connected to the cache, thereby enabling the approach to be used in many different types of coherent cache system.

It will be appreciated that a cache can be used to store instructions to be executed by an associated master device and/or the actual data manipulated by the master device during execution of those instructions. Typically, the technology described in this application will be used in association with a cache that stores data to be processed by the master device, i.e. a dedicated data cache or a unified cache used to store both instructions and data, with the mechanism of the technology described in this application being used in respect of data invalidated by a coherency action. Accordingly, in such instances, the term "data value" as used in the claims refers to the actual data used by the master device when performing the data processing operations. However, in principle the technology described in this application could also be used in respect of instructions stored within a cache, if for example those instructions could be dynamically modified, and accordingly there would be need for a cache coherency mechanism to be employed in respect of those instructions. Thus, in such instances, the term "data value" as used in the claim refers to one or more instructions to be executed by the master device.

In embodiments where the refetch control circuitry limits the refetching operation to situations where the at least one master device is considered to be a consumer of said at least one data value, there are a number of ways in which the refetch control circuitry can be configured to determine whether the at least one master device should be considered a consumer of the at least one data value that has been invalidated as a result of the coherency action. Typically, control data (for example stored in some control storage accessible to the refetch control circuitry) will be used by the refetch control circuitry in order to determine whether the at least one master device should be considered a consumer. In one embodiment, the control data may be fixed, for example provided as a hard wired input to the refetch control circuitry. For example, it may be appropriate to consider the master device to always be a consumer of any data value stored in its cache, and hence the control data can be fixed to cause the refetch control circuitry to always initiate a refetch following invalidation of data within the cache. As another example, such fixed control data may be appropriate if the at least one master device coupled to the cache is arranged to perform some dedicated processing in respect of a particular range of memory addresses, and hence that master device will always be considered to be a consumer of the data values within such a range of memory addresses.

In an alternative embodiment, the data processing apparatus further comprises a programmable control storage for storing control data used by the refetch control circuitry to identify whether the at least one master device is to be considered a consumer of said at least one data value. By using programmable control storage, the control data can be updated over time to reflect changes in the operations being performed by the at least one master device. This allows the control data to be modified with the aim of identifying those data values that are still considered to be of interest to the master device, such that if one of those data values is invalidated, the refetch control circuitry will determine that the data value should be refetched.

There are a number of ways in which the control data can be determined. In one embodiment, the control data is derived from information provided by the at least one master device indicating the data values required for the data processing operations. For example, the at least one master device may identify that it is currently performing a batch of processing operations on data values within a particular address range, thereby causing the control data to be updated to reflect that range of addresses, thus ensuring that any data value within that range of addresses that is invalidated is then refetched by the refetch control circuitry to improve the hit rate within the cache whilst those data processing operations are being performed.

In an alternative embodiment the control data is derived from information established by the cache when it first allocates the data values into the cache. In one such embodiment, the cache may be arranged to maintain a keep flag with each quanta of data stored in the cache (for example one keep flag per cache line). In such an example, when the cache line is first allocated, the cache will either set or clear that keep flag depending on selected criteria. The criteria could take many different forms. For example, the cache may determine that all read transactions initiated by master ID 0 should cause the keep flag to be set when the associated read data is first allocated into the cache.

In a further alternative embodiment, the control data is based on predicted future data requirements of the at least one master device. There are a number of ways in which the future data requirements of the at least one master device can be predicted. For example, in one embodiment, the control data may be determined by analysing past patterns of data accesses by the at least one master device. Accordingly, with such an embodiment, a prediction algorithm is executed with the aim of learning the pattern of locations accessed by the at least one master device, and then assuming that that pattern will continue.

In an alternative embodiment, the control data may be determined by analysing past patterns of coherency requests received by the cache coherency circuitry. The past patterns of coherency requests received by the cache coherency circuitry give some indication of the data values that are of interest to master devices in other parts of the coherent cache system, and dependent on the tasks being performed by the at least one master device, it may be possible to make certain assumptions about the likely future data requirements of the at least one master device based on such coherency requests.

For example, if a first master device generally acts as a consumer of data produced by another particular master device, then the pattern of coherency requests from that particular master device can be used to determine the control data, with the aim that the first master device is considered a consumer of all data produced by that particular master device, and hence refetches all data invalidated as a result of a coherency action instigated by that particular master device. As a particular example, if the first master device is a consumer of data written by a DMA engine, such an approach can be used to ensure that all cache lines invalidated by a write from the DMA engine are refetched, whilst other lines invalidated by the actions of another master device are not.

The actual form of the control data can vary dependent on embodiment. However, in one embodiment, the control data identifies one or more memory addresses that the at least one master device is a consumer of data from, and if the refetch control circuitry identifies that said at least one data value is associated with a memory address identified by the control data, the refetch control circuitry initiates the refetch of said at least one data value into said cache.

There are a number of reasons why the coherency action performed in response to a coherency request may result in the invalidation of a data value in the cache. For example, in one embodiment, the issuance of the coherency request by said another portion of the coherent cache system is due to a further master device within the coherent cache system acting as a producer to generate an updated version of said at least one data value, said further master device not having write access to said cache. Since the further master device does not have write access to the cache, it cannot directly update said at least one data value within the cache, and accordingly the coherency request is needed in order to perform a coherency action to ensure that the coherent cache system as a whole maintains a coherent view of the data. In one such embodiment, the coherent cache system employs a write invalidate cache coherency protocol, such that the coherency request received by the cache coherency circuitry requests invalidation of said at least one data value within said cache.

It should be noted that the actual timing of the invalidation operation relative to the generation of the updated version of the at least one data value by the producer can vary dependent on implementation. In one embodiment, the invalidation takes place before the producer performs any write operation in order to generate the updated version of the at least one data value. For some types of write operation, it may be necessary to ensure the invalidation occurs first. For example, if the producer is seeking to perform a write operation in respect of a subset of a cache line, then it may be necessary for the coherency operation to not only invalidate the line but also return any dirty data (i.e. any data that is more up-to-date that the copy held in shared memory), to ensure that the producer has the most up-to-date version of the cache line before it performs the write operation to a subset of that cache line.

In one embodiment, the further master device has a further cache associated therewith, the further master device causing the updated version of said at least one data value to be stored in said further cache following the invalidation of said at least one data value within said cache. Hence, at this point, the at least one data value is still retained within the coherent cache system rather than being evicted to memory. However, dependent on the relative sizes of the cache and the further cache, there may be an increased chance of the data being evicted to memory. For example, if the further cache is smaller than said cache, then following the invalidation of the data value in the cache, and the subsequent storage of the updated data value within the further cache, that updated data value is more at risk of eviction to memory when space needs to be freed up in the further cache for new data being accessed by the further master device. However, in one example embodiment, the refetch of that at least one data value into the cache by the refetch control circuitry improves retention of that at least one data value within the coherent cache system, since even if that at least one data value is subsequently evicted from the further cache, it will still be present in said cache. Hence, by appropriate setting of the control data used by the refetch control circuitry, the technique of example embodiments can increase the retention of certain data values within the coherent cache system.

In one embodiment, the refetch control circuitry may be arranged to initiate the refetch of the at least one data value as soon as it is determined that the at least one master device is a consumer of that at least one data value. However, in an alternative embodiment, the refetch control circuitry includes timing determination circuitry for determining a timing at which said refetch of said at least one data value is initiated. In one embodiment, the timing determination circuitry chooses said timing in order to seek to reduce proliferation of coherency actions within the coherent cache system.

As an example, if a write operation by the further master device causes a data value to be invalidated from the cache, and the updated data to then be stored in the further cache, then absent any refetch performed by the refetch control circuitry, the data in the further cache will typically be marked as unique, and can be updated at will by the further master device without the need for any further coherency operation within the coherent cache system. However, as soon as the updated data value is refetched by the refetch control circuitry into the cache, then to the extent it is still retained in the further cache, it will be marked as shared within the further cache. Accordingly, if the further master device then subsequently updates the data again, this will initiate a coherency operation in order to invalidate the data value in the cache so as to enable the further master device to then perform a write operation in respect of the data value in its further cache. In such scenarios, if the refetch control circuitry merely refetched the data immediately following the invalidation, this could give rise to "thrashing" within the coherent cache system, resulting in a proliferation of coherency actions which would impact overall performance. However, if a suitable delay is introduced prior to refetching, such thrashing could be avoided.

There are a number of ways in which the timing determination circuitry could operate. However, in one embodiment the timing determination circuitry determines said timing having regard to at least one of the following: (a) a fixed delay value; (b) a programmable delay value; (c) a heuristic algorithm. Considering the heuristic algorithm option, this could be run to seek to set an appropriate delay having regard to observed activity within the coherent cache system. In one embodiment, the heuristic algorithm could be run once, or at predetermined intervals, to calculate an appropriate delay value to use. However, in an alternative embodiment, the heuristic algorithm could be run every clock cycle in order to decide whether to initiate the refetch in that clock cycle or not. In such an example, the refetch control circuitry could maintain a list of refetch operations to be performed, with the heuristic algorithm deciding when to initiate each refetch.

The at least one master device and associated cache of the data processing apparatus can take a variety of forms. In one embodiment, said at least one master device comprises one master device and said cache is a level 1 cache provided solely for that master device. In such embodiments, the data processing apparatus can be replicated multiple times within the coherent cache system, with each master device and associated level one cache including the cache coherency circuitry and refetch control circuitry of example embodiments.

In an alternative embodiment, the cache may be a level two cache. In such embodiments, the at least one master device will typically not be directly connected to the level two cache, but instead will be coupled to the level two cache via an intervening level one cache. Irrespective of whether the level one cache includes the refetch control circuitry of example embodiments, the level two cache may include such refetch control circuitry, with the associated at least one master device being any master device able to perform read and write operations in respect of that level two cache. In one example embodiment, there will be between one and four master devices connected to a level two cache, and the refetch control circuitry in the level two cache will initiate a refetch on invalidation of a data value (for example if any one of those master devices is considered to be a consumer of a data value which has been invalidated as a result of a coherency action).

A coherent cache system is provided comprising a data processing apparatus in accordance with the first aspect of the present invention, at least one further master device, and a coherent interconnect to which the cache of the data processing apparatus is coupled and from which the coherency request is received.

In one embodiment, the coherent cache system further comprises at least one further cache, with the at least one further cache being coupled to the coherent interconnect.

method is provided of operating a data processing apparatus forming a portion of a coherent cache system, the data processing apparatus having at least one master device for performing data processing operations, and a cache coupled to the at least one master device for storing data values for access by the at least one master device when performing said data processing operations, the method comprising the steps of: responsive to a coherency request from another portion of the coherent cache system, performing a coherency action in respect of at least one data value stored in the cache; responsive to an indication that the coherency action has resulted in invalidation of said at least one data value in the cache, initiating a refetch of said at least one data value into said cache.

A data processing apparatus for forming a portion of a coherent cache system, comprises: at least one master device means for performing data processing operations; a cache means, coupled to the at least one master device means, for storing data values for access by the at least one master device means when performing said data processing operations; cache coherency means, responsive to a coherency request from another portion of the coherent cache system, for causing a coherency action to be taken in respect of at least one data value stored in the cache means; and refetch control means, responsive to an indication from the cache coherency means that the coherency action has resulted in invalidation of said at least one data value in the cache means, for initiating a refetch of said at least one data value into said cache means.

BRIEF DESCRIPTION OF THE DRAWINGS

The technology will be described further, by way of example only, with reference to embodiments thereof as illustrated in the accompanying drawings, in which.

DESCRIPTION OF NON-LIMITING EXAMPLE EMBODIMENTS

Figure 1:
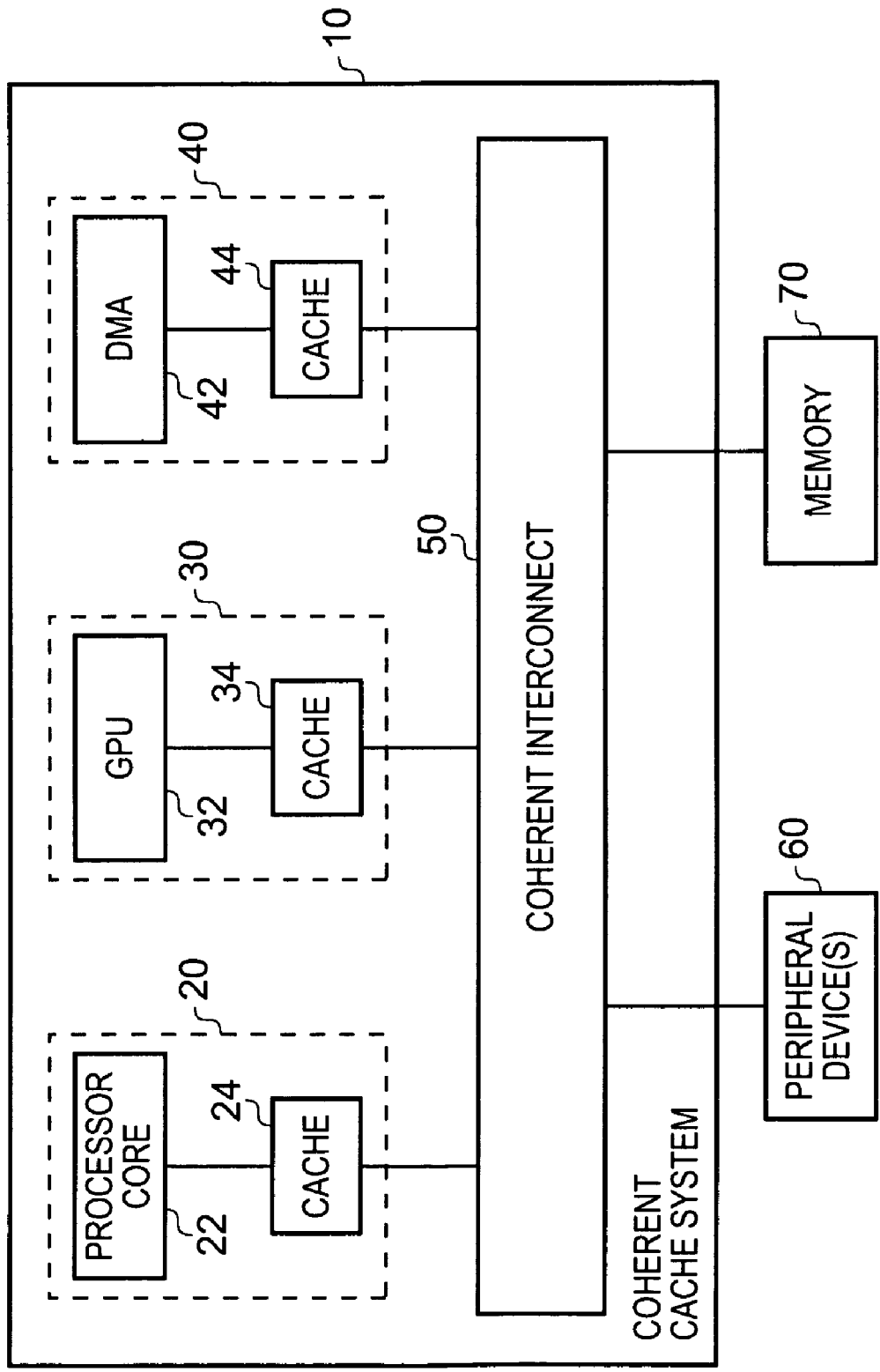
FIG. 1 is a block diagram illustrating a coherent cache system in which example embodiments may be employed.

FIG. 1 is a block diagram illustrating a coherent cache system in which example embodiments may be employed. The coherent cache system 10 comprises a coherent interconnect 50 to which a plurality of elements 20, 30, 40 are connected. Each of the elements 20, 30, 40 can be viewed as a data processing apparatus forming a portion of the coherent cache system. In this example, each of the elements 20, 30, 40 comprise a master device and associated level one cache. The master devices could all be processor cores, as for example may be the case in a symmetric multi-processing system, or alternatively may take the form of different master devices. For the purposes of illustration, FIG. 1 shows an example where the element 20 consists of a processor core 22 and associated cache 24, the element 30 consists of a graphics processing unit (GPU) 32 and associated cache 34, and the element 40 consists of a direct memory access (DMA) engine 42 and associated cache 44. It should be noted that whilst in the example of FIG. 1 each of the master devices is shown as having its own local cache, this is not essential, and one or more of the master devices may have no local cache associated therewith.

The coherent interconnect 50 couples the various elements 20, 30, 40 with shared memory 70 (there may in some embodiments be more than one shared memory), and optionally with one or more other peripheral devices 60 such as a Universal Asynchronous Receiver Transmitter (UART) device, etc.

In addition to providing the necessary interconnect structure to enable coupling between the various components connected to the coherent interconnect 50, the coherent interconnect 50 also implements a cache coherency protocol in order to ensure that whenever a master device requests access to a data value, it will access the most up-to-date version of that data value within the coherent cache system. In particular, since the data in the memory 70 is shared, it is possible that one master device 22, 32, 42 may request access to a data value which is not in its local cache but is cached in the local cache of another master device. For both read and write accesses, such cache misses will hence cause a coherency operation to be performed to see if the data is found elsewhere in the coherent cache system. For write operations, it may also be necessary to perform a coherency operation even if the data is found in the local cache. In particular, if a master device requesting a write access to the data finds the data in its own local cache, unless that cached data value is marked as unique, it is still necessary to perform a coherency operation in order to make sure that the data value is removed from any other caches within the coherent cache system before the update to the master device's local cache is made (otherwise those other caches would then be storing out of date data), or to enable the updated data value to be propagated to those other caches so that they can maintain up to date data.

Figure 2:
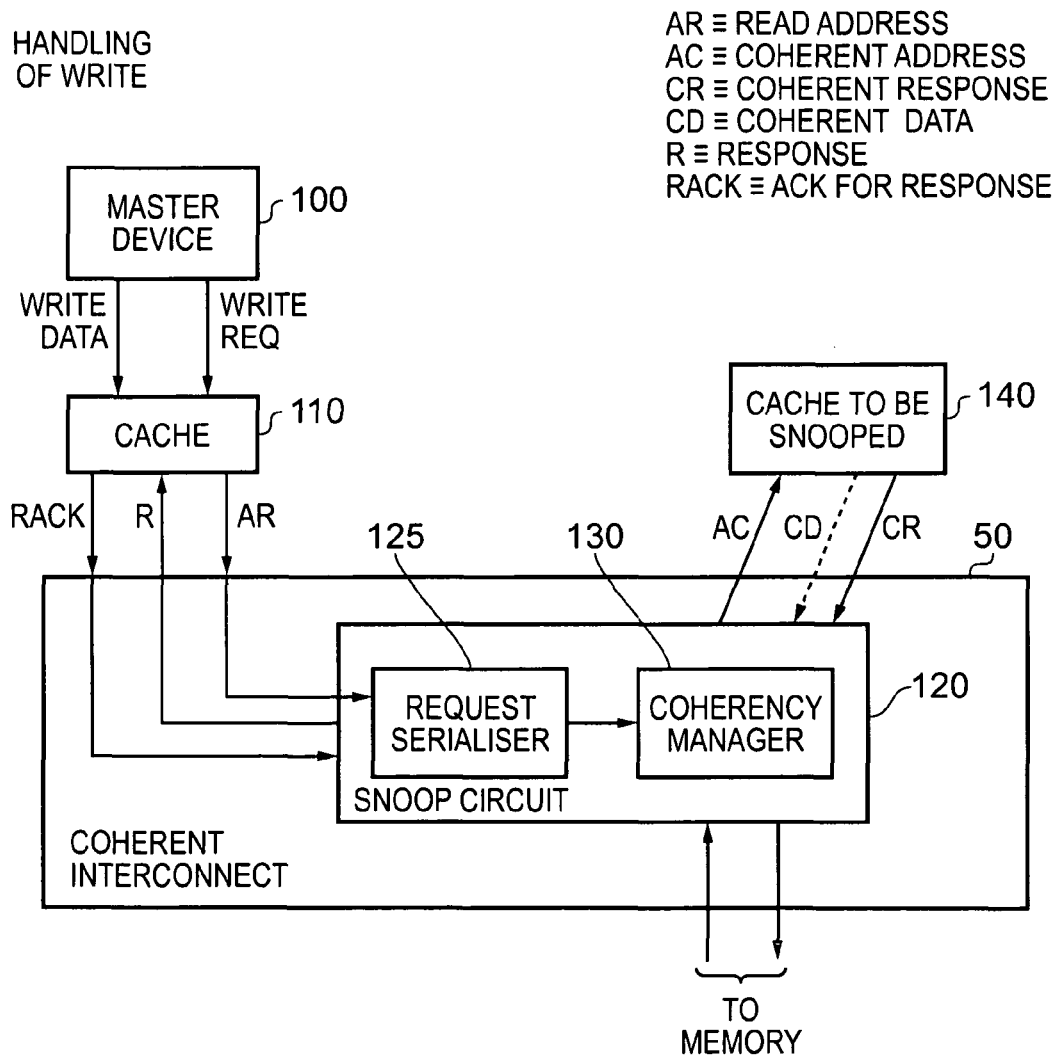
FIG. 2 illustrates the operation of the coherent interconnect of FIG. 1 when handling a write request issued by a master device and requiring a coherency operation.

FIG. 2 illustrates the operation of the coherent interconnect in such situations. The master device 100 issues a write request to its local cache 110, and also outputs write data to be written to the address specified by the write request. If the data at the address specified by the write request is cached in the cache 110, and is marked as unique (i.e. it is guaranteed that no other copies exist within the coherent cache system), then the write operation can be performed directly within the cache 110 without the need for any coherency operation. However, if the write address does not hit in the cache, or hits in the cache but the data value is not marked as unique, then it will be necessary to perform a coherency operation before the write operation can be completed.

As mentioned earlier, cache coherency protocols often use a write invalidate mechanism to maintain coherency when performing write operations, such a mechanism typically being significantly simpler to implement than a write update mechanism. Assuming a write invalidate mechanism is used, then if a cache miss occurs, or a cache hit occurs but the data is not marked as unique, a request will be issued from the cache 110 to the coherent interconnect 50 to initiate a coherency operation. In particular, that coherency request will take the form of a read address (AR) propagated from the cache to a snoop circuit 120 where it will typically first pass through a request serialiser circuit 125 which receives coherency requests issued by any of the caches within the coherent cache system, and places them in a queue for handling.

When the request reaches the head of the queue, it is passed to the coherency manager 130 for performance of the required coherency operation. In one embodiment, the coherency manager 130 keeps no local record of what data each cache is storing, and instead merely issues a coherency request to each of the caches in the coherent cache system other than the originating cache 110. For the purposes of illustration, only one such cache 140 is shown, but it will be appreciated that in a typical system the coherency request will be issued to multiple such caches (those caches also being referred to herein as the caches to be snooped). In an alternative embodiment, the coherency manager 130 may maintain some local record of address ranges held in each of the caches, and based on that information can determine a subset of the caches of the coherent cache system which need to be snooped and only then issue the coherency requests to those determined subset of caches.

Accordingly, each cache to be snooped 140 will receive a coherency request in the form of a coherent address (AC). This will cause a coherency handler within the cache to perform a lookup in its cache array to determine whether the data value for that coherent address is stored within the cache. If not, a coherent response (CR) will be returned to the coherency manager identifying that the data is not present. Further, if it is present, the data will be invalidated, and the coherent response will identify to the coherency manager 130 that the data has been invalidated.

The coherency request sent to each cache to be snooped can be of various different types, dependent on the type of write operation that the master device 100 is seeking to perform. For certain types of write operation, the coherency request may require the snooped cache to return the data if a hit is detected, in addition to invalidating the data in the snooped cache. Accordingly, as shown by the dotted line in FIG. 2, the coherent response (CR) may be accompanied by coherent data (CD) identifying the data that has been invalidated.

The coherency manager 130 collates the information received from the various caches being snooped, and dependent on the responses received, may need to access memory either to perform a write back operation (to complete the process of cleaning a cache line that has been invalidated where that cache line contains dirty data), or to perform a memory fetch (for example where the data has not been located in any caches, and the master device is seeking to write less than a full cache line's worth of data to its cache 110).

Once the coherency manager has received responses from all of the snooped caches, and performed any memory fetch or write back operations required, it will then send a coherency response (R) back to the cache 110 whereafter it will await receipt of an acknowledgement of that response (RACK) from the cache 110. Upon receipt of the acknowledgement, the snoop circuit 120 can then mark the particular coherency operation as complete.

Whilst the snoop circuit 120 will typically only issue one coherency request to a particular cache at any point in time, it is possible for the snoop circuit to overlap the handling of different coherency operations, for example where different caches need to be snooped for different coherency operations.

Once the response has been received by the cache 110, the write operation can then be performed within the cache 110, with the updated data being marked as unique, since at that point in time the cache will have all the data required in order to update an entire cache line, and will know that no other copies of the data exist within the coherent cache system.

However, it will be noted that in accordance with the write invalidate mechanism, any caches that were snooped and contained a copy of the data value being updated will now have that data marked as invalid. Accordingly, any request for that data issued by a master device connected to such a cache will then miss in the cache, thereby initiating a further coherency operation to seek to retrieve the data into the cache. This can significantly impact performance in coherent cache systems.

This performance impact is particularly significant in scenarios where one master device is acting as a producer of data to be consumed by another master device. Considering the example of FIG. 1, this may be the case where the DMA engine 42 is producing data that the GPU 32 then processes. The GPU may perform repetitive sequences of processing on blocks of data within one or more predetermined address ranges. In such embodiments, the actions of the DMA engine 42 may cause data to be invalidated in the cache 34 and instead placed within the cache 44, but with the GPU still being an active consumer of data values within the associated address range. The invalidation in the cache 34 can in such scenarios cause a significant impact on the performance of the GPU 32.

In accordance with example embodiments, one or more of the caches within the coherent cache system may be provided with refetch control circuitry which is responsive to invalidation of a data value in the cache due to performance of a coherency action, to initiate a refetch of that data value into the cache if the refetch control circuitry considers the associated master device to still be a consumer of that data value.

Figure 3:
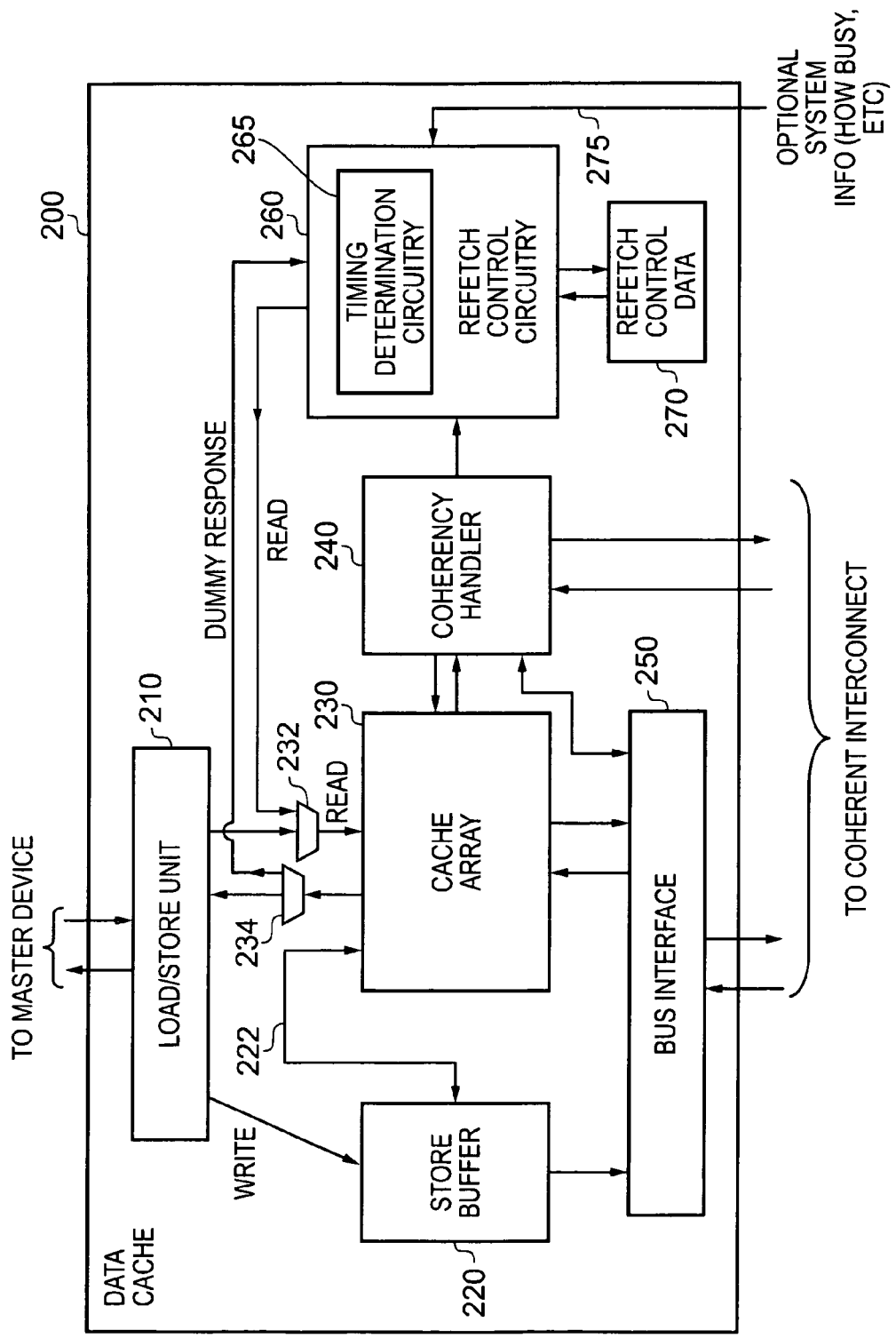
FIG. 3 is a block diagram illustrating components provided within a data cache in accordance with one embodiment.

FIG. 3 is a block diagram illustrating a data cache in accordance with one example embodiment. The data cache 200 is coupled via a load/store unit (LSU) 210 with the associated master device and is arranged to receive read and write access requests from that associated master device. In the event of a read access request, that access request can be forwarded directly to the cache array 230 (via the multiplexer 232) to enable a lookup procedure to be performed in order to determine whether the requested data value is in the cache array, if so that data value being routed back via the multiplexer 234 and the LSU 210 to the master device. In the event of a cache miss, a linefill request is forwarded via the bus interface 250 to the coherent interconnect to cause a cache line's worth of data including the data value of interest to be retrieved from the coherent cache system (or from memory 70 if not present in the coherent cache system) for storing in the cache array 230, whereafter the required data value is returned via the LSU 210 to the master device.

For write access requests, these are forwarded to the store buffer 220 from where they are then processed. In particular, for a cacheable access request, the store buffer may initiate a lookup via path 222 in the cache array 230 to determine whether the data value the subject of the write access request is within the cache array, and if so an update will be performed in the cache line of the cache array 230 (after initiating the earlier described coherency operation if the data is not marked as unique). In the event of a cache miss, a linefill process will be invoked by the store buffer 220 via the bus interface 250 to cause a cache line's worth of data to be retrieved from the coherent cache system (or from memory if not present in the coherent cache system) for storing in the cache array, whereafter the write update can take place within the cache array. Alternatively the cache line's worth of data is received into a linefill buffer located within the bus interface 250, the write update is then merged with that data in the linefill buffer, and thereafter the line of data will be allocated in the cache array 230.

A coherency handler 240 is also provided for receiving coherency requests from the snoop circuit and to then instigate the required coherency action in respect of the relevant line in the cache array 230. As discussed earlier, a coherency request received from the snoop circuit will typically identify the type of access instigating the coherency operation and the address of the data value the subject of the access request, in order to enable the coherency handler 240 to identify whether the relevant data value is stored within the cache array 230, and if so the appropriate action to take.

If as a result of the coherency operation, a cache line needs to be evicted from the cache array 230, the coherency handler 240 can communicate with the bus interface 250 in order to cause the required eviction to take place.

As also shown in FIG. 3, the data cache 200 includes refetch control circuitry 260 which is responsive to an indication from the coherency handler 240 that a data value in the cache array 230 has been invalidated, to then determine with reference to refetch control data 270 whether the master device is still considered to be a consumer of that data value. If so, the refetch control circuitry 260 initiates a refetch of that data by issuing a read request via the multiplexer 232 to the cache array 230. That read request will then be handled in exactly the same way as described above for a read request issued by the load/store unit 210 and will result in a cache line's worth of data including the required data value to be fetched via the bus interface 250 and stored within the cache array 230. However, in this instance, rather than the read data being returned via the LSU 210 to the master device, it is instead routed from the multiplexer 234 as a dummy response to the refetch control circuitry 260 to confirm to the refetch control circuitry that the refetch has been completed.

As will be discussed in more detail later with reference to FIGS. 7 and 8, the refetch control data 270 referenced by the refetch control circuitry 260 can take a variety of forms and may be fixed or programmable. Further, as will be discussed in more detail later, the refetch control circuitry 260 can in one embodiment include timing determination circuitry 265 to determine the time at which the refetch takes place following a determination that the refetch is required. Whilst in some embodiments, such a refetch may be performed immediately upon determining it is needed, the timing determination circuitry 265 can in some embodiments allow a certain time to elapse before the refetch takes place, with the aim of seeking to reduce proliferation of coherency actions within the coherent cache system.

There are a number of ways in which the timing determination circuitry can determine a suitable timing at which to issue the refetch request, for example by utilising a fixed delay value, a programmable delay value, or the output of a heuristic algorithm. In one embodiment, the timing determination circuitry can optionally receive system information via the path 275 identifying for example levels of activity within certain parts of the coherent cache system, which the timing determination circuitry can take into account when deciding when to issue the refetch request.

Figure 4:
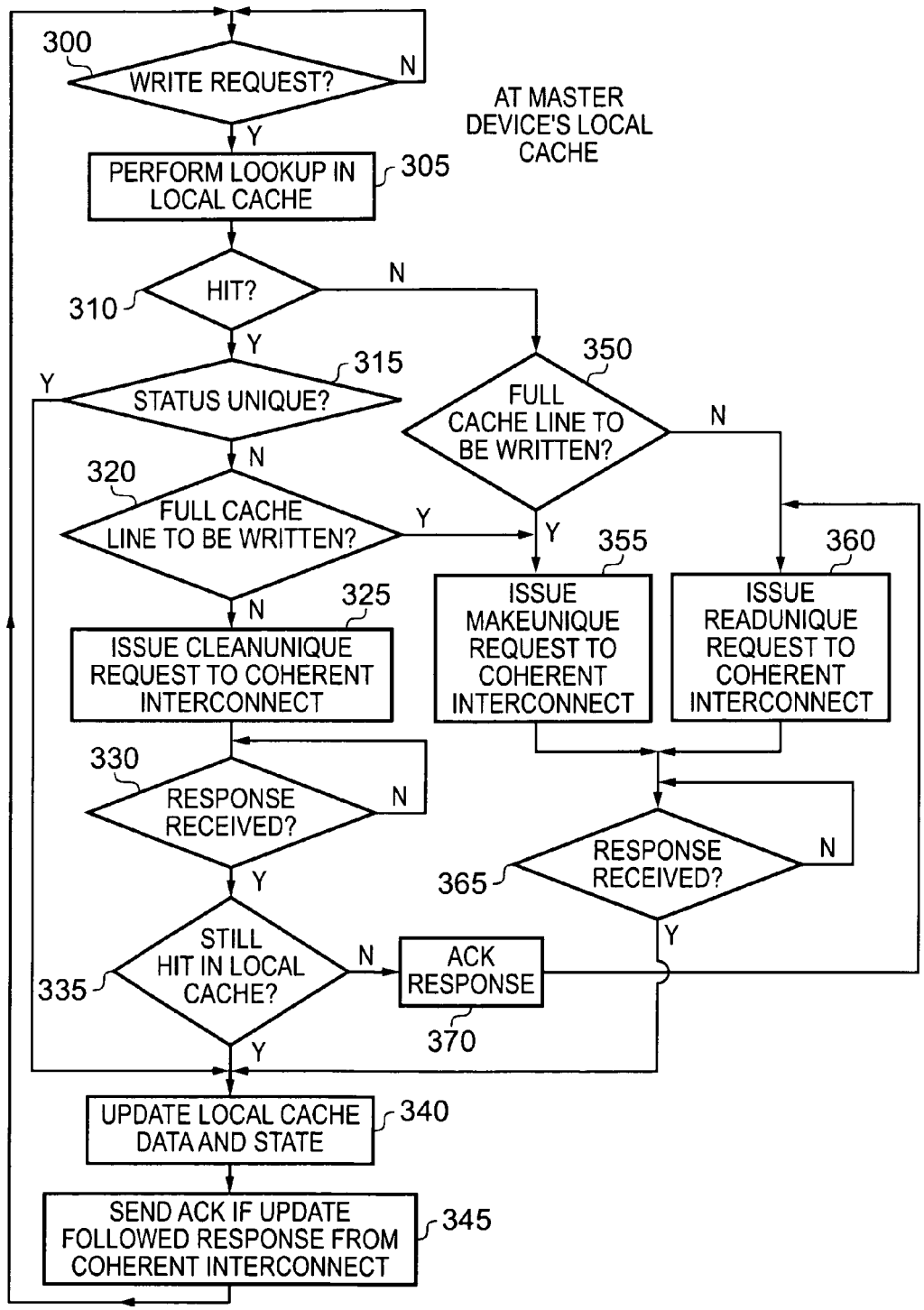
FIG. 4 is a flow diagram illustrating the steps performed at a master device's local cache when handling a write request in accordance with one embodiment.

FIG. 4 is a flow diagram illustrating the operations performed at a master device's local cache in one embodiment, when a write request is issued by the master device. At step 300, it is determined whether a write request has been issued by the master device, and if so a lookup is performed within the local cache at step 305. It is then determined at step 310 whether a hit has been detected in the cache, and if so it is identified at step 315 whether the status of the hit entry is "unique", i.e. no other cache within the coherent cache system is storing a copy of that data. If the data is unique, then the process branches directly to step 340, where the local cache entry is updated in accordance with the write request. When following this route to step 340, the state of that updated cache entry can also be retained as unique, but it may be necessary to mark that data as dirty if an update is not also being performed at the same time to memory. When reaching step 340 directly from step 315, the subsequent step 345 is redundant, since the update was not performed following a response from the coherent interconnect, and accordingly the process returns to step 300.

If at step 315, it is determined that the status of the hit entry is not unique, it is then determined at step 320 whether a full cache line is being written to by the master device. If not, a CleanUnique request is issued from the cache to the coherent interconnect 50 at step 325, this form of coherency request causing the snoop circuit to invalidate entries in any other caches, cleaning them if necessary (i.e. if any of those caches hold the data and it is marked as dirty), thereby making the data unique for the requesting local cache. Since any dirty entries found will be cleaned, this also means that at this point in time memory will contain the version of the data that is most current prior to the write operation being performed. No data is returned to the local cache in response to the CleanUnique request, the cache not needing this data as a hit was detected at step 310.

Having issued the CleanUnique request, the cache then awaits receipt of a response from the snoop circuit at step 330. Once the response is received, the cache then performs another lookup to check that the write address still hits in the local cache, this step being performed at step 335. This is necessary due to the delay between issuing the CleanUnique request and the response being received from the snoop circuit, during which time the data could have been evicted from the local cache. However, assuming the data is still in the local cache, then the process proceeds to step 340 where the local cache's copy of the data is now updated in accordance with the write operation, and the state is changed to unique and dirty (i.e. equivalent to the "modified" state in accordance with the MOESI protocol). Then an ack is returned from the cache to the snoop circuit at step 345 to confirm receipt of the response received at step 330, whereafter the process returns to step 300.

If a hit was no longer detected in the cache at step 335, then the process branches to step 370, where an ack is issued to the snoop circuit to acknowledge receipt of the response received at step 330, whereafter the process proceeds to step 360 where a ReadUnique request is issued to the coherent interconnect in order to request the data. Step 360 is also reached if a hit was not detected in the cache at step 310, and it is determined that a full cache line is not being written at step 350, since again in this scenario it will be necessary for the cache to be provided with the relevant cache line of data, upon which the write operation can then be actioned.

When actioning the ReadUnique request, the snoop circuit requests each snooped cache to return the data if a hit occurs in the snooped cache, and also to clean and invalidate that data from the cache. As an alternative to cleaning and invalidating the data (which would result in the dirty data being written back to memory 70), an alternative approach is to merely invalidate the data in the snooped cache and mark the data returned to the snoop circuit as dirty, so that that dirty status can be passed back to the requesting cache as part of the response from the snoop circuit.

Accordingly, following execution of the ReadUnique request by the snoop circuit, the local cache will receive a response at step 365, whereafter it can then perform the write operation by merging the new write data with the returned cache line's worth of data, and writing that updated cache line of data to the local cache with the state being set as unique and dirty. Then, at step 345, an ack will be sent to the snoop circuit to acknowledge receipt of the response received at step 365.

If on performing the lookup in the local cache at step 305, a hit is not detected, and the full cache line is being written, then the process proceeds via steps 310 and 350 to step 355. Step 355 is also performed if a hit was detected at step 310, the status of the hit line is not unique, and the full cache line is being written to. Since in both instances a full cache line is being written to, there is no need for any data to be returned as part of the coherency response. Instead, the local cache issues a MakeUnique request to the coherent interconnect which causes each of the snoop caches to be requested to invalidate that data if a hit is detected. However, in this instance, no clean operation is required since the write request is specifying a full cache line's worth of data to be written. Once the MakeUnique request has been actioned by the coherent interconnect, a response will be received by the cache at step 365, whereafter it can then perform the write operation at step 340. Again, the state will be updated to unique and dirty, and at step 345 an acknowledgement will be sent to the snoop circuit to acknowledge the response received at step 365.

It should be noted that FIG. 4 represents only one way of processing the write request at the master device's local cache. It should be noted that the "no" paths can always be followed safely, and accordingly (with the exception of the wait steps 330 and 365 which have to behave correctly) it will be possible to reduce complexity, albeit with an associated reduction in performance, by removing one or more of the decision blocks and instead directly following the no path in all instances.

Figure 5:
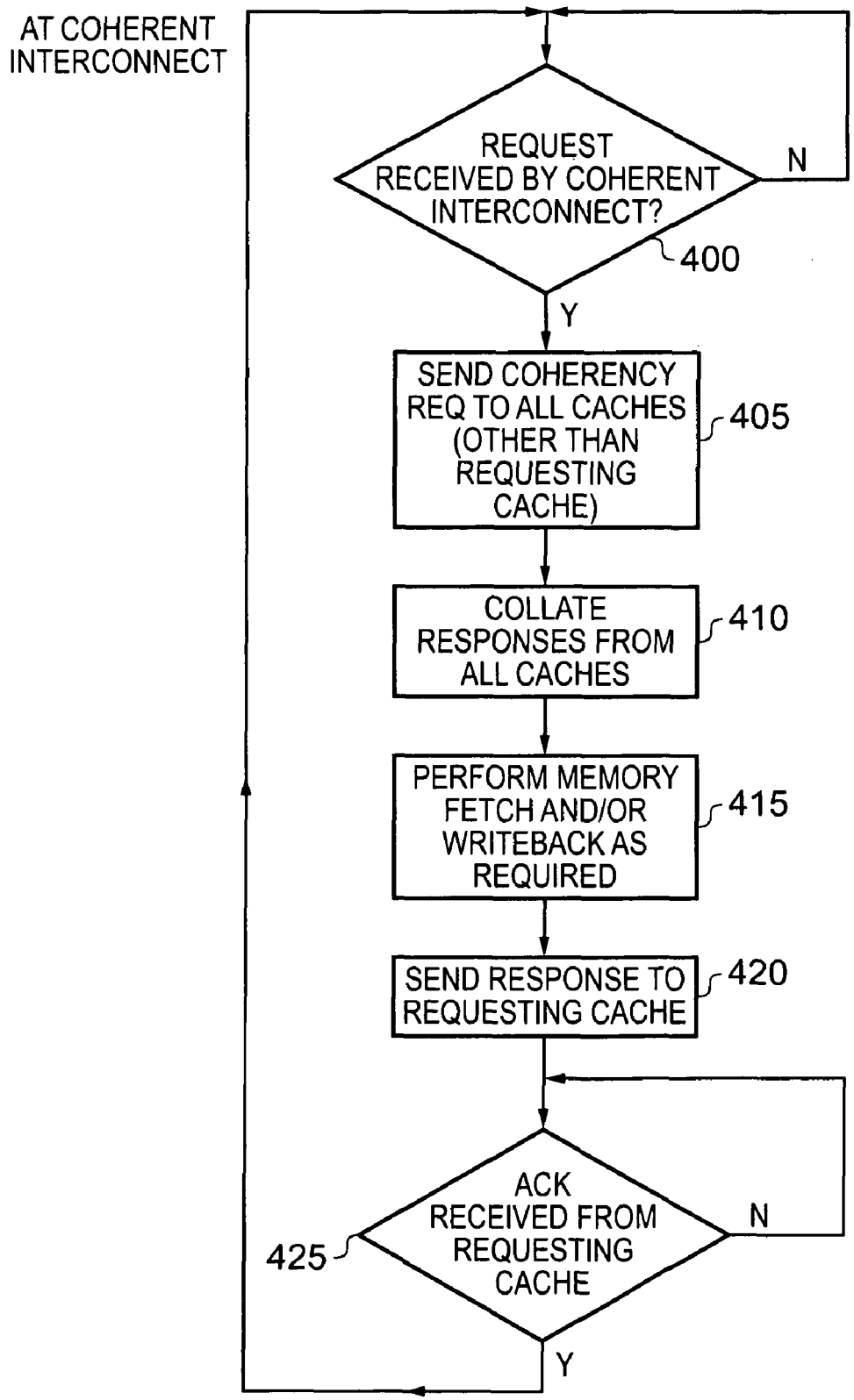
FIG. 5 is a flow diagram illustrating the steps performed at the coherent interconnect upon receipt of a request from a master device (or its local cache) in accordance with one embodiment.

FIG. 5 is a flow diagram schematically illustrating the actions taken at the coherent interconnect upon receipt of a coherency request issued by one of the caches. At step 400, such a coherency request is awaited, and upon receipt the process proceeds to step 405 where, following any serialisation performed by the request serialiser 125, the request is processed by the coherency manager 130 to cause a coherent request to be sent to all of the caches other than the requesting cache at step 405. As will be apparent from the earlier discussions, the exact form of the coherency request will depend on the type of request received at step 400.

The coherency manager 130 will then collate all of the responses from the caches at step 410, and will at step 415 perform any memory fetch and/or write back operations in respect of the memory 70 that are required. As discussed earlier, a write back operation will be required in order to write dirty data to memory as a result of a clean operation, and a memory fetch will be required if the coherency request at step 400 requires data to be returned, and that data is not found in any of the caches.

At step 420, a response is then sent to the requesting cache, whereafter an acknowledgement from the requesting cache is awaited at step 425. Following step 425, the process returns to step 400. However, as discussed earlier, in some embodiments the coherency manager will not need to wait for one coherency operation to be fully actioned before it can begin actioning another. For example, multiple coherency requests can be issued in parallel to different addresses, with the proviso that each snooped cache will typically only be able to handle one coherency request at a time.

Figure 6:
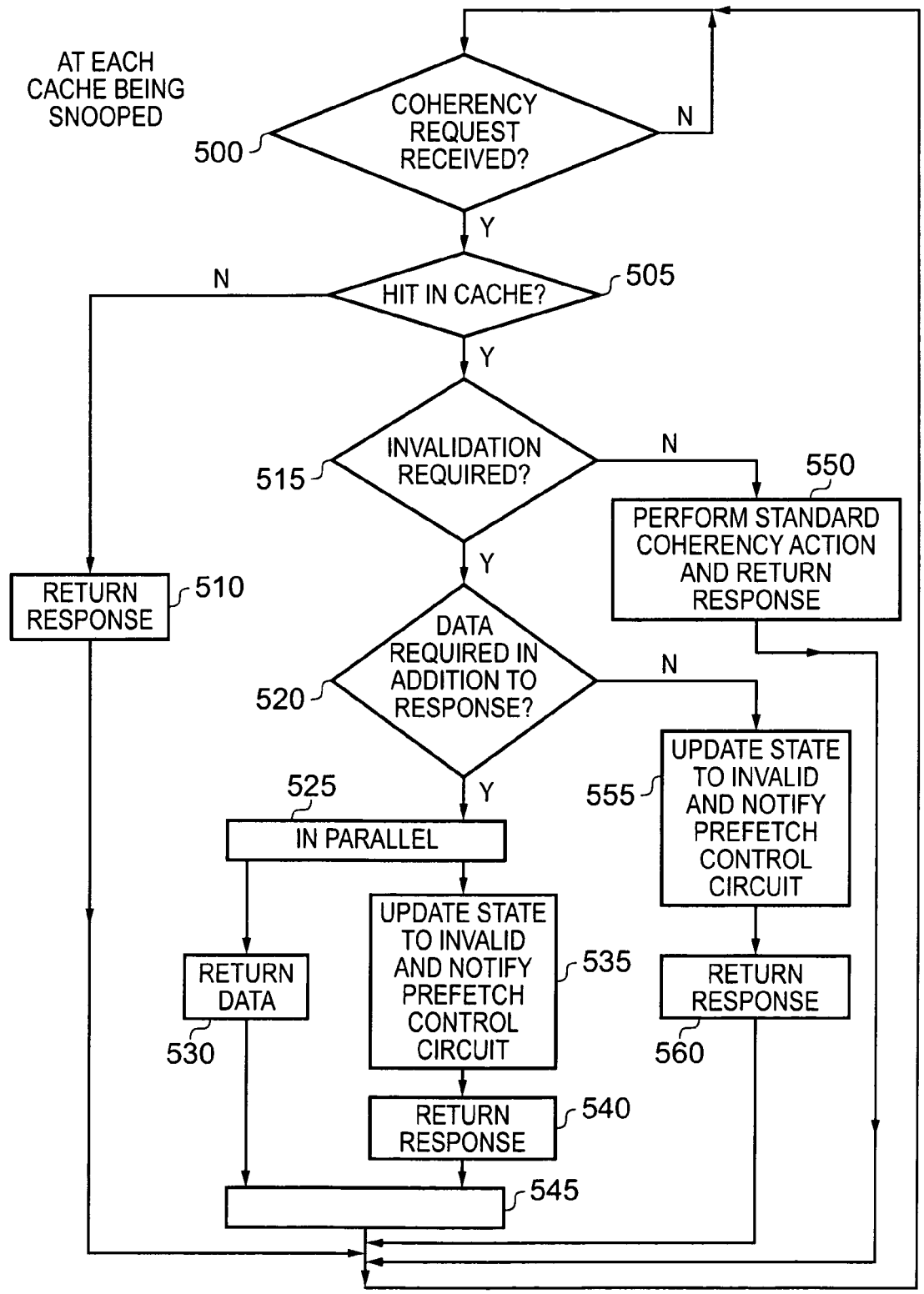
FIG. 6 is a flow diagram illustrating the steps performed at each cache snooped by the coherent interconnect during the performance of a coherency operation in accordance with one embodiment.

FIG. 6 is a flow diagram illustrating the steps performed at each cache being snooped. At step 500, a coherency request is awaited, and upon receipt, the coherency handler 240 then performs a lookup in the cache array of the cache to determine whether a hit is detected. If no hit is detected at step 505, then a response is returned at step 510 to the coherency manager 130 to confirm that no hit was detected, whereafter the process returns to step 500.

However, assuming a hit is detected in the cache, it is then determined whether invalidation is required. If not, then another standard coherency action is performed and the response returned at step 550. As such coherency actions and responses are not of relevance to the technology described in this application, they are not discussed further herein.

However, if the coherency action requires invalidation of the cache line, then it is determined at step 520 whether the data is required to be sent to the snoop circuit in addition to the response. The data will be required at step 520 if the requesting master requires the data, and/or if the data needs to be cleaned therefore requiring the interconnect to receive the data so that it can store it to memory. If the data is not required, then at step 555 the state of the cache line is updated to invalid and the prefetch control circuit 260 is notified of the invalidation of the cache line. Thereafter, a response is returned to the snoop circuit at step 560.

If at step 520 it is determined that data is required in addition to the response, then, as indicated by the box 525, two sequences are performed in parallel. Firstly, steps 535 and 540 correspond with the earlier described steps 555 and 560, and result in the prefetch control circuit being notified of the invalidation of the cache line. In parallel, the data is returned at step 530 to the coherency manager. If a clean of the data is required, the coherency manager will then communicate with the memory to perform the write back operation required. The two parallel flows then merge at box 545, whereafter the process returns to step 500.

Figure 7:
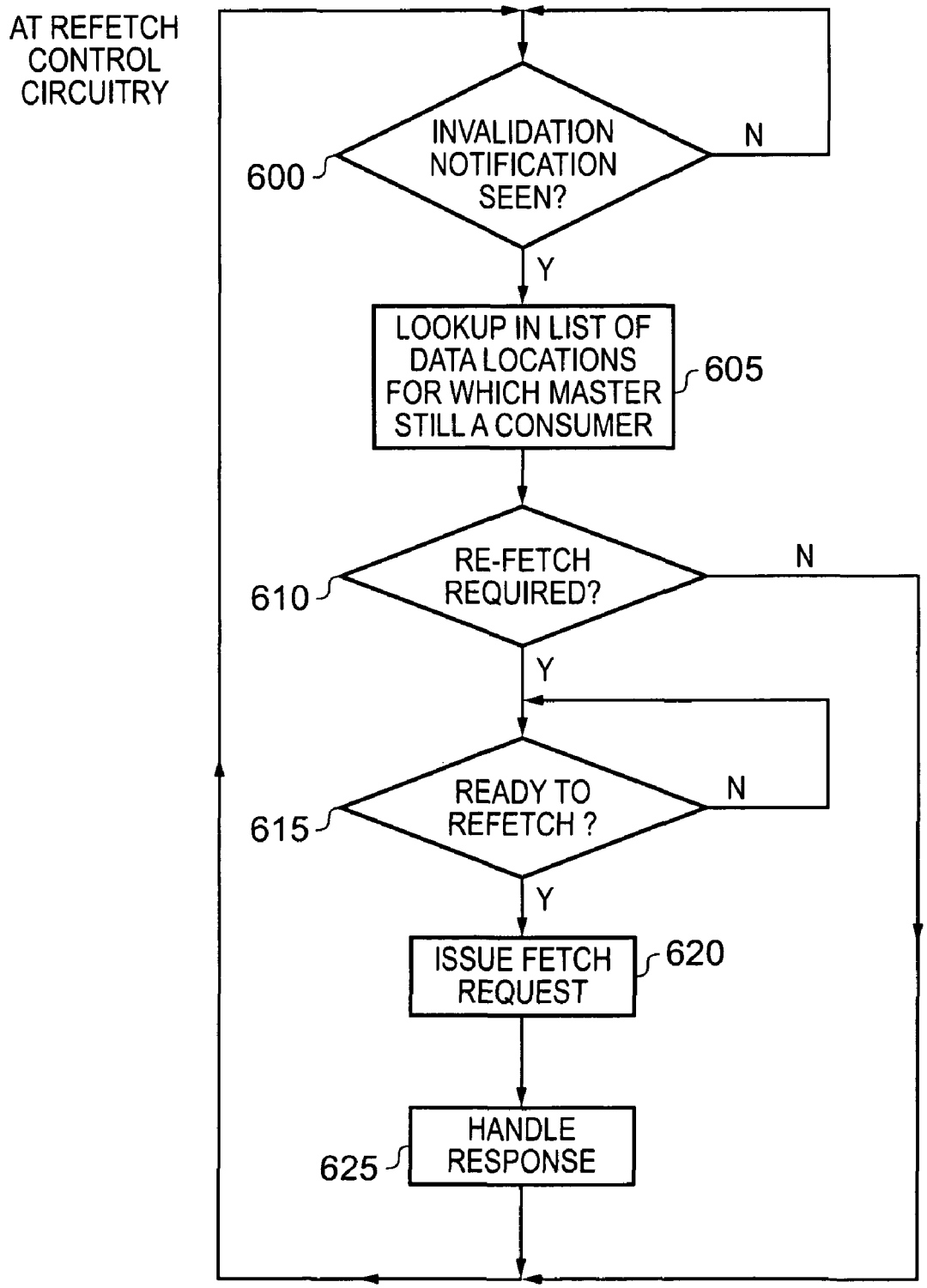
FIG. 7 is a flow diagram illustrating the operation of the refetch control circuitry of FIG. 3 in accordance with one embodiment.

FIG. 7 is a flow diagram illustrating the steps performed by the refetch control circuitry 260 of a cache in accordance with one embodiment. At step 600, the prefetch control circuitry determines whether an invalidation notification has been issued by the coherency handler, and if so the prefetch control circuitry then performs at step 605 a lookup in a list of data locations for which the master is still a consumer. Such a list is one example of the prefetch control data 270 of FIG. 3. Such a list may be predetermined, as for example may be appropriate if the master device is a dedicated master device, which always performs processing operations on a particular block of memory addresses. More typically, the refetch control data may be maintained in a programmable control storage, so that the list of data locations can be updated periodically to reflect, for example, the activities currently being performed by the master device.

In one example, the list of data locations may be derived from information provided by the master device indicating, for example, a block of memory addresses that it is currently performing processing operations in respect of. Alternatively, such a list of data locations may be derived from predicted future data requirements of the master device. Such prediction can be performed in a variety of ways, for example by analysing past patterns of data accesses by the master device, and assuming that similar patterns of accesses will continue. Alternatively, the coherency requests received by the coherency handler 240 may be analysed in order to try and detect patterns of coherency requests, and from those patterns infer whether the master device is likely to continue to need access to the invalidated data value.

In another embodiment, in certain scenarios, the control data may be programmed such that the master device is considered to be a consumer of any data stored in the cache array irrespective of any information indicative of actual future need by the master device, so as to automatically trigger a refetch of the data into the cache array following its invalidation. This can in some instances help to retain data within the coherent cache system rather than it being evicted to memory, for example where the data cache into which the data is being refetched is significantly larger than another cache within the coherent cache system that is initiating the coherency requests causing the invalidation.

Following the lookup performed at step 605, it is determined whether a refetch of the data is required, i.e. whether having regard to the list, the master device is considered to be a consumer of the data that has been invalidated. If a refetch is not required, then the process merely returns to step 600. However, assuming a refetch is required, then it is determined at step 615 whether the refetch control circuitry is ready to refetch the data. In one embodiment, the refetch control circuitry can be arranged to initiate the refetch as soon as the requirement for refetching is determined at step 610, in which case step 615 can be omitted. However, more generally, timing determination circuitry 265 may be provided to determine the time at which the refetch is issued.

In one embodiment, the timing determination circuitry may make reference to a fixed timing delay, or to a programmable timing delay, in order to determine the time at which the refetch is initiated. In some instances, the introduction of a delay before performing the refetch can reduce the proliferation of coherency requests within the coherent cache system. For example, if the master device and associated local cache which initiated the coherency request resulting in the data being invalidated in the snooped cache will then be performing a sequence of data processing operations on that data, it will typically be significantly more efficient if that data can be retained as unique by that local cache whilst those operations are performed. However, any refetch initiated by the snooped cache will cause the data in the local cache to lose its unique status, thereby increasing the likelihood that a further coherency request will be required whilst the associated master device is performing its processing operations. Based on some knowledge as to the length of time the data may be required for by the master and its associated local cache, the timing determination circuitry in the snooped cache can set a delay so that it requests a refetch of the data at a time when it is less likely to be of continued use to the master and local cache that originally caused the invalidation in the snooped cache.

As another example of an implementation for the ready to refetch step 615, the timing determination circuitry 265 may be arranged to use a heuristic algorithm to determine the delay to be introduced, the heuristic algorithm taking one or more inputs indicative of the activities of the coherent cache system, and seeking to determine a delay which will reduce proliferation of coherency actions within the coherent cache system. Having determined the delay, the prefetch control circuitry will then await the elapse of that delay before determining that it is ready to refetch the data.

It will be apparent that there are many ways in which the heuristic algorithm could be configured. As one particular example, the heuristic algorithm could be arranged to cause the re-fetch to only be issued when the current bandwidth on the interconnect is less than a predetermined value X. As another example, the heuristic algorithm could keep track of the period between accesses to the particular location previously, and issue the re-fetch with the aim of having the data available again in the cache "just in time".

Following a determination at step 615 that the prefetch control circuitry is ready to refetch the data, a fetch request is then issued at step 620, which as discussed earlier with reference to FIG. 3 may involve the issue of a read request to the cache array, which will result in a miss in the cache array and the subsequent issuance of a request to the coherent interconnect to seek to retrieve the data. In one embodiment, the coherency request issued by the cache in such instances will not be of a type requiring the data to be invalidated in the snooped caches, since such an approach could lead to thrashing within the coherent cache system, where data is continuously being invalidated in a first cache, stored in a second cache, then invalidated in the second cache, stored in the first cache, etc.

Following the issue of the fetch request, the prefetch control circuitry then handles the response at step 625 before the process returns to step 600. As discussed earlier with reference to FIG. 3, such handling may involve receiving a dummy response from the cache array once the data has been refetched into the cache array.

Figure 8A:
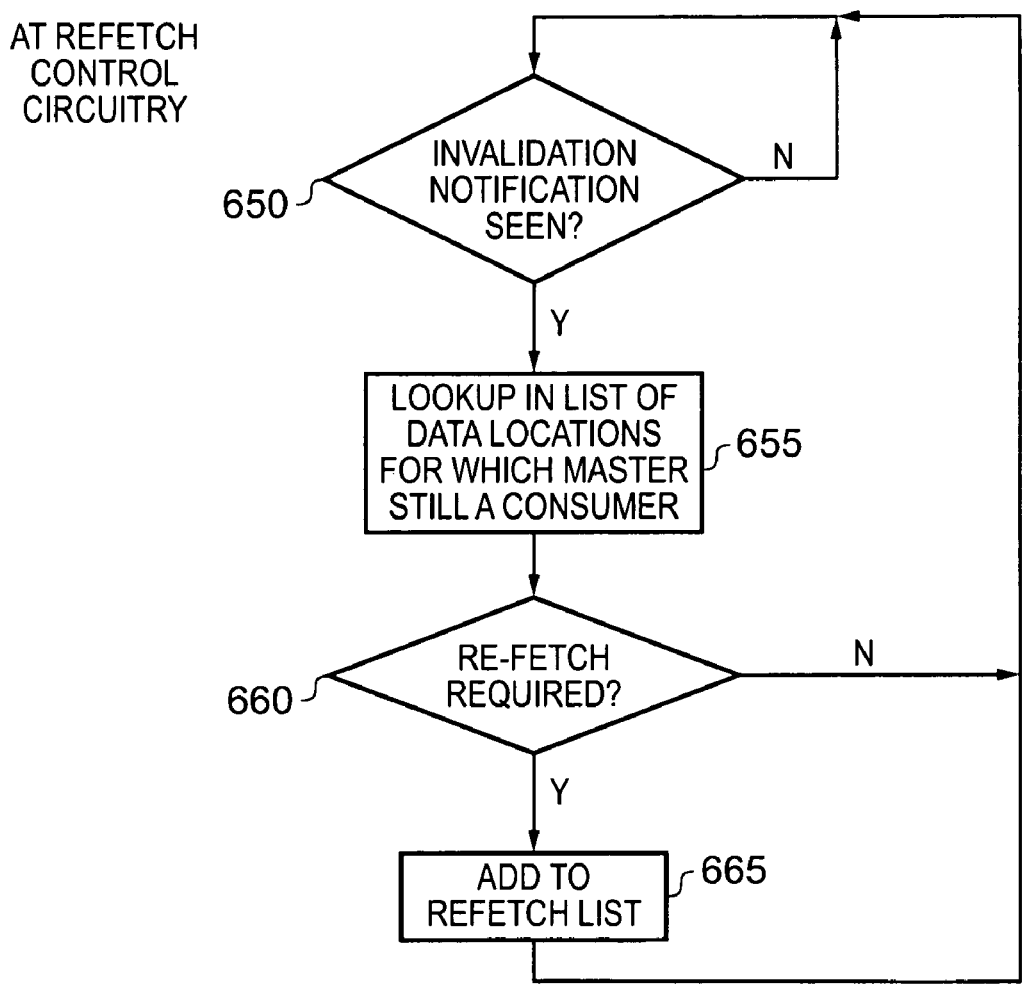
FIGS. 8A and 8B are flow diagrams illustrating the operation of the refetch control circuitry of FIG. 3 in accordance with an alternative embodiment.
Figure 8B:
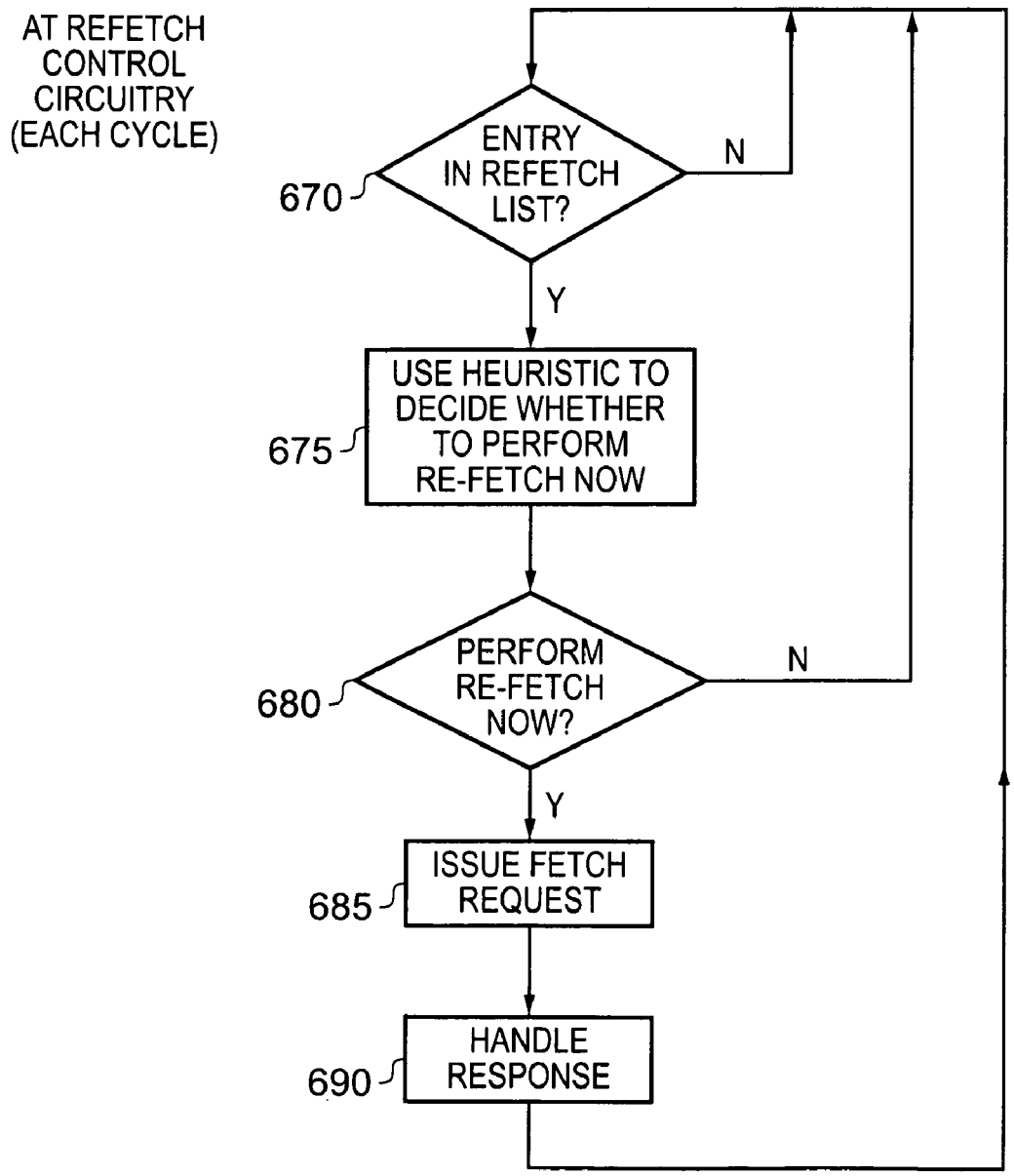

FIGS. 8A and 8B illustrate an alternative embodiment of the refetch control circuitry. Steps 650, 655 and 660 of FIG. 8A correspond with steps 600, 605 and 610 of FIG. 7, and accordingly will not be discussed further herein. However, in this embodiment, if a refetch is determined to be required at step 660, then an entry is added to a refetch list at step 665 identifying a list of data values to be refetched.

As shown by FIG. 8B, a separate process is then performed by the refetch control circuitry, typically every clock cycle. At step 670, it is determined whether there is at least one entry in the refetch list, and if not no action is required. However, if there is at least one entry in the refetch list, then the process proceeds to step 675, where a heuristic algorithm is used to decide whether to perform a refetch now for one of the entries in the refetch list. The heuristic algorithm can take a variety of inputs in order to determine whether it is appropriate to perform a refetch operation in the particular clock cycle, and for example may make use of the optional system information received over path 275 in FIG. 3, for example with the aim of seeking to issue refetch requests when the coherent cache system is less busy. If it is decided that a refetch should not be performed now, then the process branches from step 680 back to step 670. However, assuming a refetch is to be performed, the process proceeds from step 680 to step 685. Steps 685 and 690 correspond with steps 620 and 625 of FIG. 7, and accordingly will not be discussed further herein.

When employing the approach of FIGS. 8A and 8B, each entry in the refetch list could be removed from the list when the refetch request for that entry is issued at step 685. Alternatively, a flag could be maintained with the entry following the fetch request being issued at step 685 (to identify that the refetch is in hand for that entry), with the entry being removed from the list when the response is handled at step 690.

Figure 9:
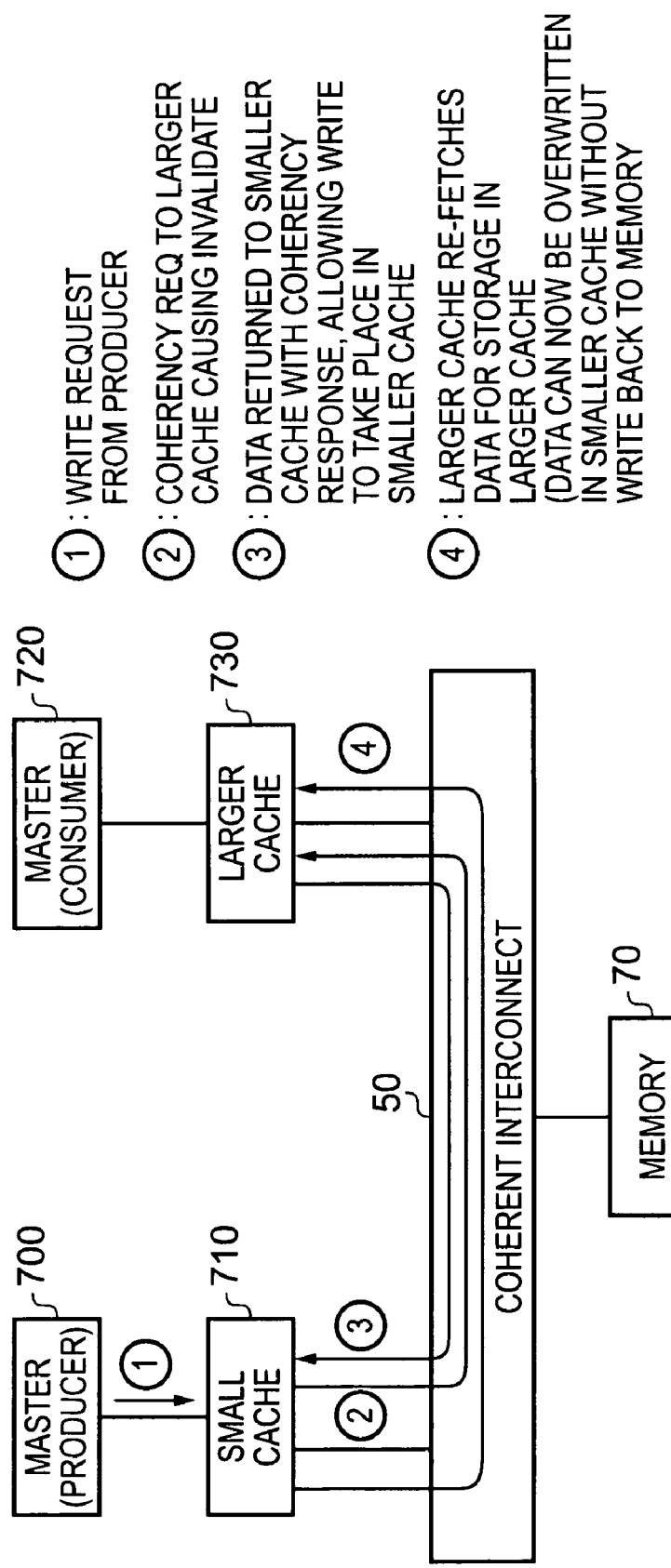
FIG. 9 illustrates one example use of the techniques of embodiments in order to improve retention of data within the coherent cache system.

FIG. 9 illustrates one example embodiment where a master 700 acting as a producer of data values within a particular address range has a relatively small cache 710 associated therewith, whilst the master device 720 acting as a consumer of the data values within that address range has a relatively larger cache 730 associated therewith. A sequence of events are illustrated by the numbers 1 through 4. Firstly, as indicated by line 1, a write request is issued from the producer 700 to write one or more data values. Assuming this does not result in a hit in the cache 710 in respect of data values uniquely held by that cache, this will result in a coherency request being propagated to the cache 730 via the coherent interconnect 50, as indicated by line 2 in FIG. 9. In this example, it is assumed that the coherency operation performed requires the data to be returned to the cache 710, and that a hit occurs in the cache 730. Accordingly, as indicated by the line 3, the data is returned from the cache 730 to the cache 710 with the coherency response, allowing the write to take place in the cache 710, and with the data in the cache 730 being invalidated.

Without the refetch mechanism, the data in question now resides in the small cache 710 rather than the larger cache 730, and there is hence an increased chance that that data will be evicted to memory 70 at some point due to the ongoing activities of the master 700. However, if the refetch control circuitry of example embodiments is employed within the larger cache 730, and the address range of the data in question is indicated as being an address range for which the master 70 is a consumer, then the refetch mechanism will cause the data to be refetched for storage in the larger cache 730, as indicated by the line 4. In one scenario, the data will also remain in the smaller cache 710, but that data can now be overwritten in the smaller cache 710 without any need for the data to be evicted to memory 70 due to it still residing within the larger cache 730. Such a mechanism can be used to increase the retention of data values within the coherent cache system.

As an alternative to the smaller cache 710 retaining the data when it is refetched into the larger cache 730, the smaller cache may instead be arranged to return the data as unique and dirty to the larger cache 730, with the data in the smaller cache 710 being invalidated at that point. This would enable the producer 700 to free up a cache line in its cache without having to do a write back to memory, and hence that cache line is now available for another write operation. This means that to avoid off-chip accesses the producer's cache 710 need only be large enough to hold all the cache lines the producer has written to but that have not migrated to other caches, rather than having to be big enough to hold all the lines that the producer will write to.

Figure 10:
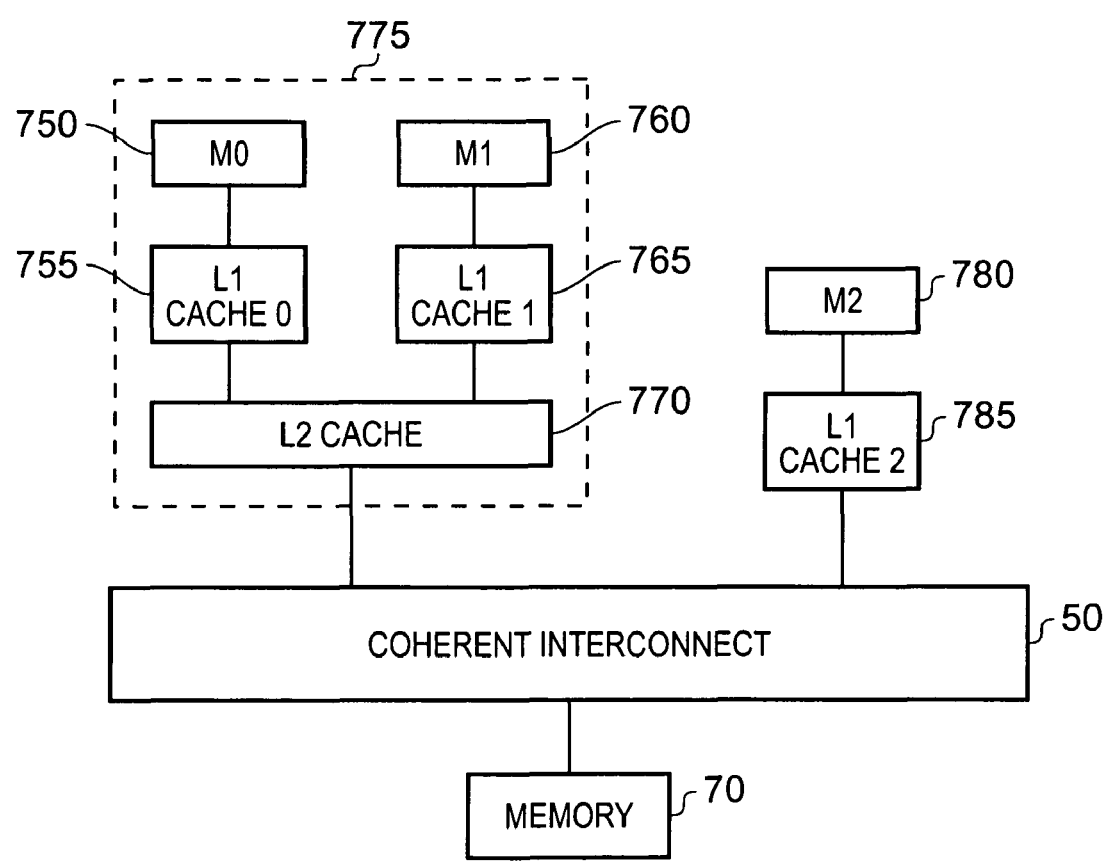
FIG. 10 illustrates the use of the technique of embodiments in association with a level two cache.

In the examples discussed so far, the caches in which the refetch control circuitry has been incorporated have been considered to be level one caches connected directly to a master device. However, as illustrated schematically by the example embodiment of FIG. 10, such refetch control circuitry can also be used in association with other caches, for example the level two cache 770. In this example, the two master devices 750, 760 are connected to their own local level one caches 755, 765, with both masters then sharing a level two cache 770. The level two cache 770 is then connected to the coherent interconnect 50 which provides connection to memory 70, and also may have one or more other caches and associated masters coupled thereto, for example the level one cache 785 and associated master device 780 shown in FIG. 10.

Irrespective of whether the level one caches 755 and 765 include the refetch control circuitry of example embodiments, the level two cache 770 may be provided with such refetch control circuitry such that when a coherency request received from the coherent interconnect 50 causes the level two cache 770 to invalidate a cache line, it can determine whether to refetch that cache line into the level two cache. For the example of the level two cache 770, it has two associated master devices, namely the master devices 750 and 760, and in one embodiment the refetch control circuitry of the cache 770 will have access to refetch control data identifying whether either one of those master devices is considered to be a consumer for the invalidated cache line. Hence, in this example, the elements within the dotted box 775 can be considered to be a data processing apparatus forming a portion of the coherent cache system, with the level two cache 770 being coupled to two master devices and incorporating both the cache coherency circuitry and the refetch control circuitry of example embodiments. In one embodiment, each of the level one caches 755, 765 will also include such refetch control circuitry, but in an alternative embodiment the refetch control circuitry may be omitted from those level one caches.

Figure 11:
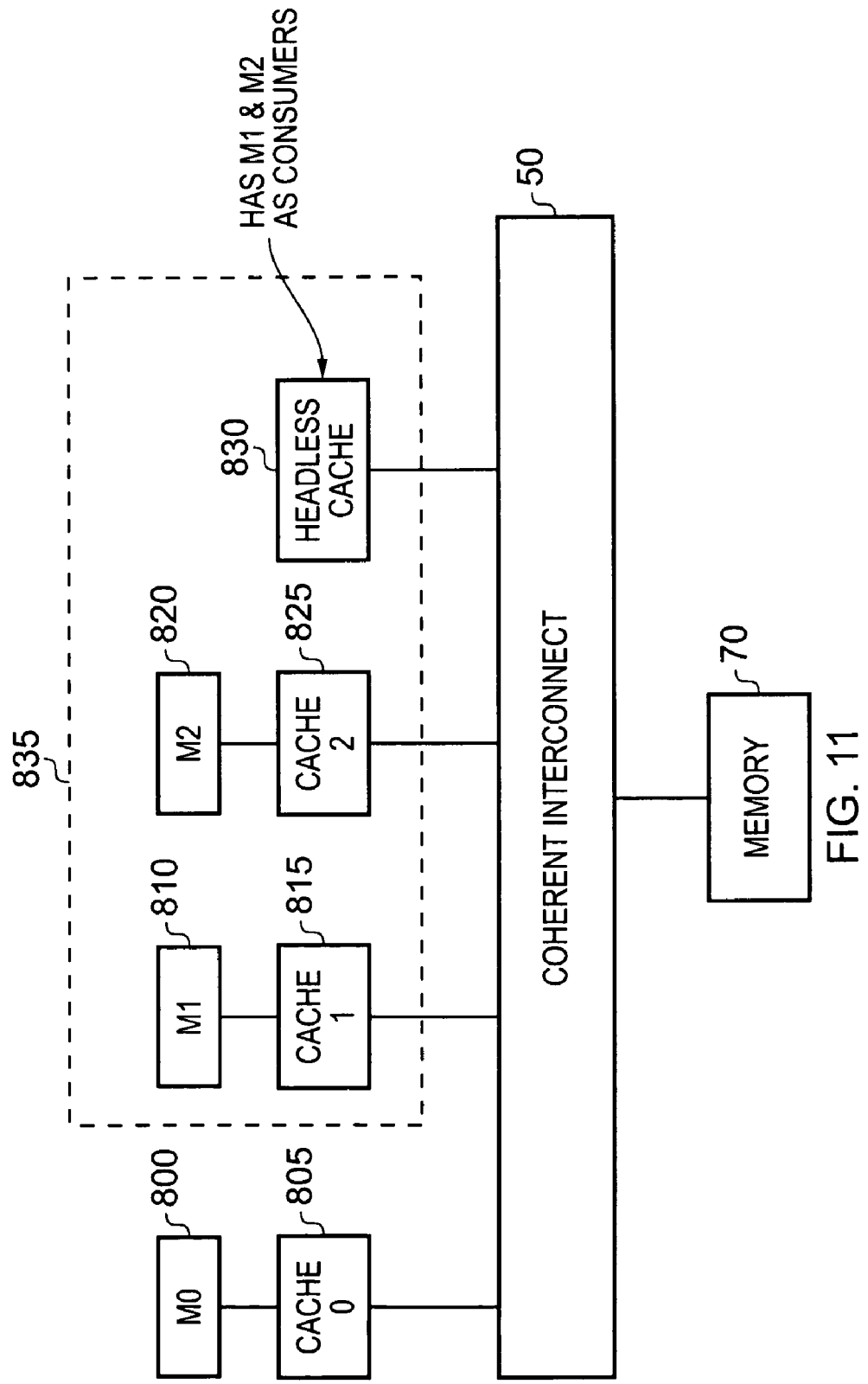
FIG. 11 illustrates the use of the techniques of embodiments in association with a headless cache.

FIG. 11 illustrates an alternative embodiment where a headless cache 830 (i.e. a cache with no directly connected master device) is also arranged to include refetch control circuitry of embodiments. In this example, three master devices 800, 810, 820 are connected via their own local caches 805, 815, 825, respectively, to the coherent interconnect 50, and in addition the headless cache 830 is connected to the coherent interconnect 50. In addition to any of the caches 805, 815, 825 including refetch control circuitry, the headless cache 830 can also include such refetch control circuitry. In this example, the headless cache 830 is used as a store for data values accessed by the master devices 810 and 820, and hence the refetch control circuitry within the headless cache 830 will have access to refetch control data identifying whether either master 810 or master 820 is still be to be considered a consumer of any data value invalidated from the headless cache in response to a coherency action performed by the headless cache. Accordingly, in this embodiment, the elements within the dotted box 835 can be considered to constitute a data processing apparatus forming a portion of the coherent cache system, with the master devices 810 and 820 being coupled to the headless cache via their own level one caches 815, 825 and the coherent interconnect 50.

As will be appreciated from the above description, the technique of the above described embodiments provides a mechanism for refetching data into a cache following its invalidation due to a coherency action, with the refetch being triggered from the coherency action rather than awaiting some action to be taken by the master connected to the cache. Such an approach can increase the chances of a hit being detected in caches of a coherent cache system, and hence reduce the latency of accesses to memory (which is typically off-chip). Considering the producer-consumer model, the reduced latency may also enable power savings to be achieved. Furthermore, because the refetch mechanism of example embodiments does not require any action by the masters connected to the caches, the technique provides a particularly effective mechanism for use in a heterogeneous system with a variety of different master devices.

Although particular example embodiments have been described herein, it will be appreciated that the claims are not limited thereto and that many modifications and additions thereto may be made within the scope of the invention.

We claim:

1. A data processing apparatus for forming a portion of a coherent cache system, comprising:
    at least one master device for performing data processing operations;
    a cache coupled to the at least one master device and configured to store data values for access by the at least one master device when performing said data processing operations;
    cache coherency circuitry, responsive to a coherency request from another portion of the coherent cache system, to cause a coherency action to be taken in respect of at least one data value stored in the cache; and
    refetch control circuitry, responsive to an indication from the cache coherency circuitry that the coherency action has resulted in invalidation of said at least one data value in the cache, to initiate a refetch of said at least one data value into said cache, wherein:
    the refetch control circuitry is configured to initiate said refetch if the refetch control circuitry considers the at least one master device to be a consumer of said at least one data value; and
    the data processing apparatus further comprises a control storage for storing control data used by the refetch control circuitry to identify whether the at least one master device is to be considered a consumer of said at least one data value.

2. A data processing apparatus as claimed in claim 1, wherein the control storage is programmable.

3. A data processing apparatus as claimed in claim 1, wherein said control data is derived from information provided by the at least one master device indicating the data values required for the data processing operations.

4. A data processing apparatus as claimed in claim 1, wherein said control data is derived from information established by the cache when it first allocates the data values into the cache.

5. A data processing apparatus as claimed in claim 1, wherein said control data is based on predicted future data requirements of the at least one master device.

6. A data processing apparatus as claimed in claim 5, wherein the control data is determined by analysing past patterns of data accesses by the at least one master device.

7. A data processing apparatus as claimed in claim 5, wherein the control data is determined by analysing past patterns of coherency requests received by the cache coherency circuitry.

8. A data processing apparatus as claimed in claim 1, wherein the control data identifies one or more memory addresses that the at least one master device is a consumer of data from, and if the refetch control circuitry identifies that said at least one data value is associated with a memory address identified by the control data, the refetch control circuitry initiates the refetch of said at least one data value into said cache.

9. A data processing apparatus as claimed in claim 1, wherein the issuance of the coherency request by said another portion of the coherent cache system is due to a further master device within the coherent cache system acting as a producer to generate an updated version of said at least one data value, said further master device not having write access to said cache.

10. A data processing apparatus as claimed in claim 9, wherein the coherent cache system employs a write invalidate cache coherency protocol, such that the coherency request received by the cache coherency circuitry requests invalidation of said at least one data value within said cache.

11. A data processing apparatus as claimed in claim 10, wherein the further master device has a further cache associated therewith, the further master device causing the updated version of said at least one data value to be stored in said further cache following the invalidation of said at least one data value within said cache.

12. A data processing apparatus as claimed in claim 11, wherein:
said cache and said further cache form at last part of the coherent cache system that is coupled to memory;
said further cache is smaller than said cache; and
the refetch into said cache of said at least one data value by the refetch control circuitry improves retention of said at least one data value within the coherent cache system.

13. A data processing apparatus as claimed in claim 1, wherein the refetch control circuitry includes timing determination circuitry for determining a timing at which said refetch of said at least one data value is initiated.

14. A data processing apparatus as claimed in claim 13, wherein said timing determination circuitry chooses said timing in order to seek to reduce proliferation of coherency actions within the coherent cache system.

15. A data processing apparatus as claimed in claim 13, wherein the timing determination circuitry determines said timing having regard to at least one of the following:
(a) a fixed delay value;
(b) a programmable delay value;
(c) a heuristic algorithm.

16. A data processing apparatus as claimed in claim 1, wherein said at least one master device comprises one master device and said cache is a level 1 cache provided solely for that master device.

17. A data processing apparatus as claimed in claim 1, wherein said cache is a level 2 cache.

18. A coherent cache system comprising:
a data processing apparatus as claimed in claim 1;
at least one further master device;
a coherent interconnect to which the cache of said data processing apparatus is coupled and from which said coherency request is received.

19. A coherent cache system as claimed in claim 18, further comprising:
at least one further cache;
said at least one further cache being coupled to the coherent interconnect.

20. A method of operating a data processing apparatus forming a portion of a coherent cache system, the data processing apparatus having at least one master device for performing data processing operations, and a cache coupled to the at least one master device for storing data values for access by the at least one master device when performing said data processing operations, the method comprising the steps of:
responsive to a coherency request from another portion of the coherent cache system, performing a coherency action in respect of at least one data value stored in the cache;
responsive to an indication that the coherency action has resulted in invalidation of said at least one data value in the cache, initiating a refetch of said at least one data value into said cache, wherein:
said refetch is initiated if the at least one master device is considered to be a consumer of said at least one data value;
the data processing apparatus further comprises a control storage for storing control data; and
said control data is used to consider whether said at least one master device is a consumer of said at least one data value.

21. A data processing apparatus for forming a portion of a coherent cache system, comprising:
at least one master device means for performing data processing operations;
a cache means, coupled to the at least one master device means, for storing data values for access by the at least one master device means when performing said data processing operations;
cache coherency means, responsive to a coherency request from another portion of the coherent cache system, for causing a coherency action to be taken in respect of at least one data value stored in the cache means; and
refetch control means, responsive to an indication from the cache coherency means that the coherency action has resulted in invalidation of said at least one data value in the cache means, for initiating a refetch of said at least one data value into said cache means, wherein:
the refetch control means is configured to initiate said refetch if the refetch control means considers the at least one master device means to be a consumer of said at least one data value; and
the data processing apparatus further comprises a control storage means for storing control data used by the refetch control means to identify whether the at least one master device means is to be considered a consumer of said at least one data value.

* * * * *